United States Patent Office 2,780,322
Patented Feb. 5, 1957

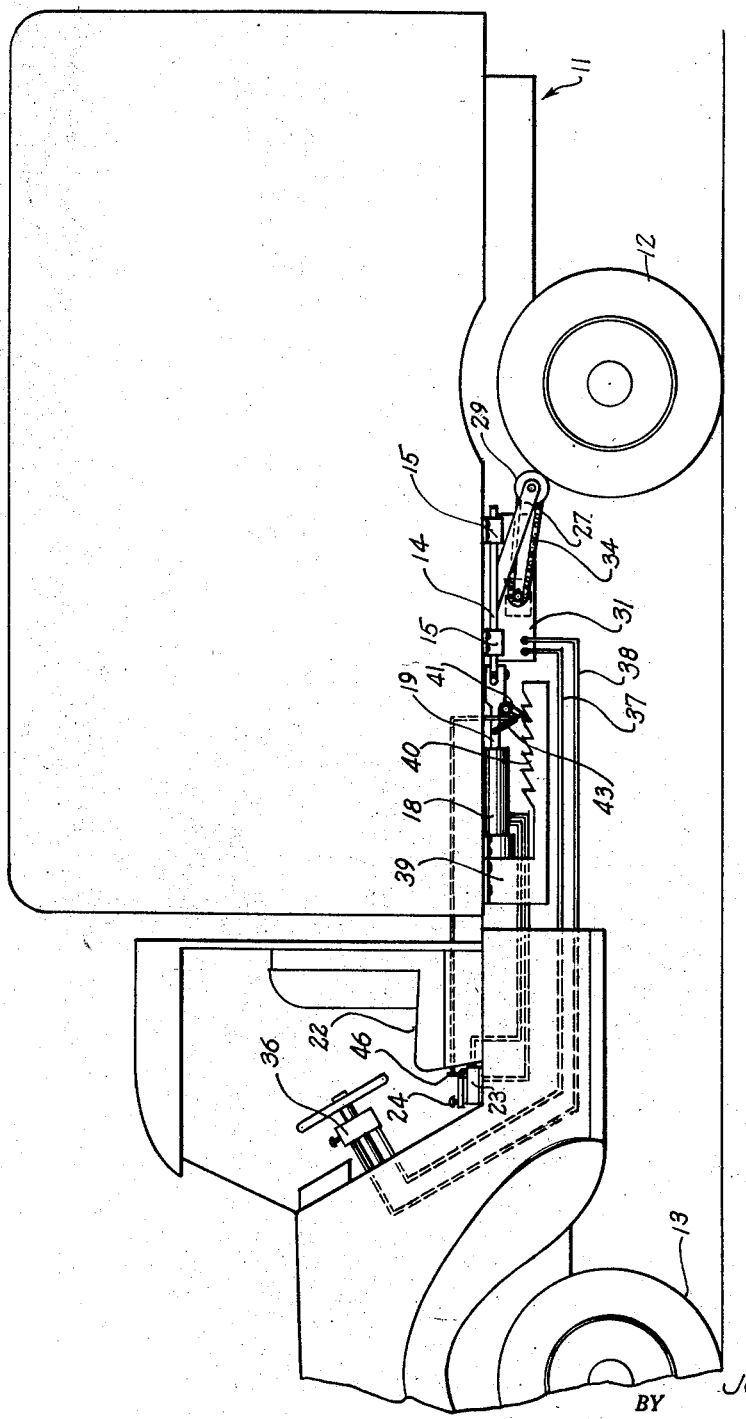

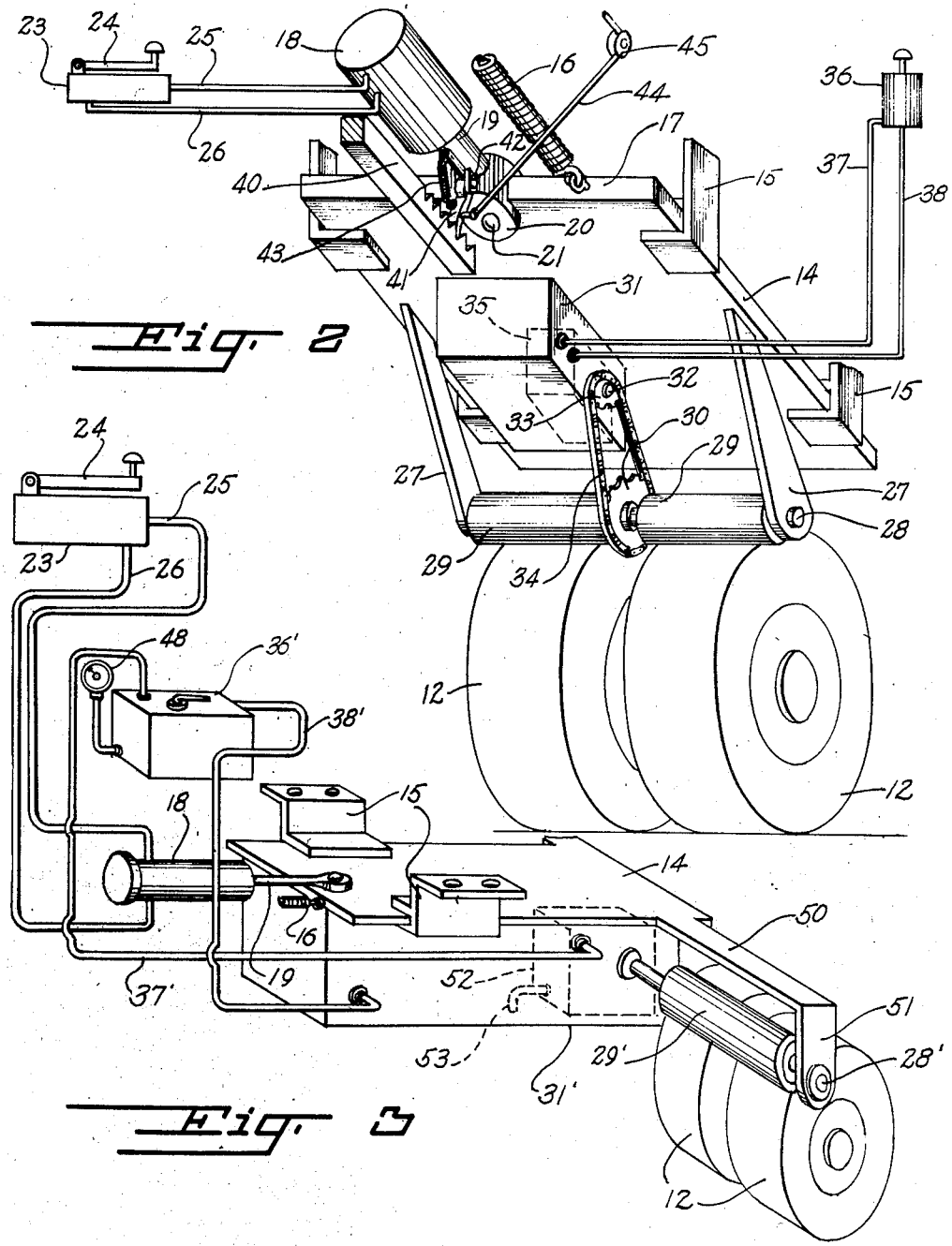

2,780,322

MOTOR VEHICLE HYDRAULIC BRAKE SYSTEM

Joseph C. Hickle, Fairbank, Pa.

Application July 16, 1954, Serial No. 443,791

1 Claim. (Cl. 188—90)

This invention relates to motor vehicle brake systems, and more particularly to an improved hydraulic brake system particularly suitable for use with heavy motor vehicles, such as trucks or the like.

A main object of the invention is to provide a novel and improved motor vehicle hydraulic brake system which involves relatively simple components, which is easy to install, and which provides a controllable, substantially positive braking action.

A further object of the invention is to provide an improved hydraulic brake system especially suitable for use on heavy vehicles, such as trailer trucks, said brake system involving inexpensive components, being rugged in construction, providing an easily controllable, positive braking action without excessive friction and heat, and involving relatively few parts.

Further objects and advantages of the invention will become apparent from the following description and claim, and from the accompanying drawings, wherein:

Figure 1 is a side elevational view of a truck equipped with an improved hydraulic brake system constructed in accordance with the present invention;

Figure 2 is a perspective bottom view of the components of the brake system employed in Figure 1 and showing the hydraulic connections thereof; and Figure 3 is a perspective view of the component parts of a modified form of hydraulic brake system for motor vehicles according to the present invention.

Referring to the drawings, and more particularly to Figures 1 and 2, 11 designates a trailer truck of conventional construction having the sets of dual rear wheels 12, 12 and having the front wheels 13.

Designated at 14 is a generally rectangular carriage member in the form of a rectangular plate which is slidably supported at the opposite side margins thereof by respective pairs of brackets 15, 15 secured to and depending from the frame of the truck 11, whereby the carriage member 14 is slidably supported for longitudinal movement toward and from the rear wheels 12, 12. It will be understood that a carriage member 14 may be provided on each side of the truck located forwardly adjacent a set of dual wheels 12, 12.

The carriage member 14 is biased forwardly by a coiled spring 16 secured to the forward edge 17 of the carriage member and connected to a portion of the frame of the truck located forwardly of the edge 17. Designated at 18 is a cylinder secured to the frame of the truck and having a piston 19, the end of the piston 19 being connected to the forward edge portion of the carriage member 14, as by the grooved head 20 provided on the piston 19 which receives the edge portion of the carriage 14 and which is secured thereto by a suitable rivet or similar fastening member 21.

Mounted in the operator's cab of the truck, and preferably on the cab floor forwardly adjacent the operator's seat 22 is a cylinder 23 provided with a suitable piston which is actuated by a foot pedal 24. The cylinder 23 is connected to the cylinder 18 by the respective conduits 25 and 26 and is suitably arranged so that when the pedal 24 is depressed, hydraulic fluid is forced from the cylinder 23 to the conduit 25 to the cylinder 18, causing the piston 19 to be forced rearwardly out of the cylinder 18 and causing the carriage member 14 to be thereby moved rearwardly toward the dual wheels 12, 12. The conduit 26 provides a return path for the hydraulic fluid from the cylinder 18 to the cylinder 23. Upon release of the foot pedal 24, the spring 16 moves the carriage 14 forwardly toward its original position.

Secured on the shaft 28 are the respective rollers 29, 29 which are provided with a suitable friction surface, such as rubber coating, and which are movable into driving engagement with the dual wheels 12, 12 when the carriage member 14 is moved rearwardly as above described. Secured on the shaft 28 between the rollers 29, 29 is a sprocket wheel 30. Secured to the carriage member 14 depending therefrom is a housing 31 containing a hydraulic pump having the driving shaft 32. Secured on the shaft externally of the housing 31 is the sprocket wheel 33 which is coupled by sprocket chain 34 to the sprocket wheel 30, whereby the pump, designated at 35 is operated responsive to the rotation of the rollers 29, 29.

Designated at 36 is a valve which is mounted in a suitable position in the driver's cab, for example, on the steering post, said valve being connected in circuit with the pump 35 by the respective conduits 37 and 38.

The valve 36 is of conventional construction and is manually operated to control the amount of restriction in the fluid circuit of the pump 35, whereby the circulation of hydraulic fluid through the pump, the conduit 37, the valve 36, and the conduit 38, may be controlled, and whereby the degree of resistance to the operation of the pump 35 may be regulated by regulating the degree of closure of the valve 36. Thus, if a high degree of resistance is desired, the valve 36 is operated to an almost closed position, whereby the circulation of hydraulic fluid through the pump is greatly retarded, creating a resistance to rotation of the shaft 32 which is transmitted by the sprocket wheel 33 and sprocket chain 34 to the shaft 28, which in turn is transmitted by the rollers 29, 29 to the truck dual wheels 12, 12.

Secured to the truck frame forwardly adjacent the cylinder 18 is a bracket 39 formed with the rearwardly extending, longitudinal ratchet bar 40 which is engageable by a pawl member 41 pivotally secured to and depending from the piston 19, the pivotal connection of the pawl member 41 being shown at 42. The pawl member 41 is biased downwardly toward the ratchet bar 40 by a coiled spring 43 connected between the pawl member 41 and the piston 19, as shown in Figures 1 and 2, the spring 43 acting to bias the pawl 41 into engagement with the ratchet bar 40, whereby the wall will interlock with the ratchet bar, securing the piston 19 against return into the cylinder 18 until the pawl is elevated out of engagement with the ratchet bar 40. Connected to the pawl 41 is the control cable 44 which passes over suitable pulleys on the truck frame and which is connected to a control handle 46 suitably mounted in the operator's cab adjacent the foot pedal 24. Thus, the pawl 41 may be elevated to disengage the pawl from the bar 40 by applying downward pressure on the foot pedal 24 and at the same time pulling the operating handle 46 forwardly, as viewed in Figure 1, releasing the carriage member 14 and allowing the carriage member to be moved forwardly by its biasing spring 16.

In operation, the driver of the truck applies the brakes by stepping downwardly on the foot pedal 24, thereby causing the piston 19 of the cylinder 18 to be moved rearwardly, together with the carriage member 14, bringing the rollers 29, 29 into driving engagement with the wheels 12, 12 of the respective sets of rear dual wheels of the truck. It will be understood that an assembly such as that shown in Figure 2 is provided with each set of rear dual wheels, and that the respective cylinders 18 of the assemblies are connected in parallel and are controlled simultaneously by the foot pedal controlled cylinder 23.

It will be further understood that the respective pumps 35 of the assemblies are connected in parallel to the conduits 37 and 38 and are controlled simultaneously by the control valve 36.

With the rollers 29, 29 in driving engagement with the dual wheels 12, the pumps 35 are operated and hydraulic fluid is circulated through the circuit including the conduits 37 and 38 and the control valve 36. The amount of restriction in this circuit can be regulated by adjusting the valve 36, as above described, whereby a desired retarding effect may be provided which is transmitted to the dual wheels 12, 12 and which acts to brake said wheels to a degree desired by the operator. When the carriages 14 are moved rearwardly, they will be locked in braking positions by their pawl members 41 which lockingly engage their associated ratchet bars 40. The braking action may be terminated by elevating the pawl members 41, to allow the biasing spring 16 to return the carriage members 14 to their forward positions.

It will be understood that the cables 44 may be both connected to the control handle 46 so that said cables will simultaneously control their respective pawl members 41, whereby both pawl members 41 may be elevated to unlocking positions by moving the control handle 46 forwardly.

In the modified form of the invention shown in Figure 3, the carriage member 14 is provided with laterally extending arms 50 projecting from the rear portions of the opposite longitudinal sides thereof, said arms being formed at their outer ends with depending portions 51 which are journaled on the outer end portions of respective shafts 28', the inner ends of the shafts 28' being journaled in respective pump housings 31'. Each pump housing contains a pump 52 which is driven by a respective shaft 28'. Secured on each shaft 28' is a roller 29' which is movable into driving engagement with the dual wheels 12, 12 responsive to the depression of the foot pedal 24, by means of a cylinder 18 and a piston 19, the cylinder 18 being secured to the truck frame and the piston 19 being connected to the carriage member 14, as in the previously described form of the invention. A control valve assembly 36' is provided in the operator's cab, and the outlet conduits 37' of the pumps 52 are connected through the control valve 36' and respective conduits 38' to the respective pump housings 31'. The inlet conduits 53 of the respective pumps are exposed to the interior of the respective pump housings 31', whereby respective pump circuits are defined including the control valve 36'.

As in the previously described form of the invention, the degree of restriction of the hydraulic fluid circulating through the respective pump circuits associated with the pumps 52 can be regulated by adjusting the control valve 36', to provide a desired braking effect when the rollers 29' are brought into driving engagement with the wheels 12 of the truck.

The control valve 36' is provided with a pressure gauge 48 which is connected so as to indicate the amount of hydraulic fluid braking pressure developed by the pumps 52 when the rollers 29 are moved into driving relation with the wheels 12, and also to indicate when there is a lack of braking pressure, thus providing a warning of unsafe braking conditions. While not illustrated in Figure 3, it will be understood that the same pawl and ratchet means employed in the form of the invention of Figures 1 and 2 may be similarly employed with the form of the invention of Figure 3 to lock the carriage 14 in braking position.

While certain specific embodiments of an improved hydraulic brake system for motor vehicles has been described in the foregoing description, it will be understood that various modifications within the spirit of the invention may occur to those skilled in the art. Therefore, it is intended that no limitations be placed on the invention except as defined by the scope of the appended claim.

What is claimed is:

In a motor vehicle, a braking system comprising a carriage having longitudinally extending parallel side edge portions, bracket means on the vehicle supportingly engaging said side edge portions and being arranged to slidably support said carriage for longitudinal movement toward and from a wheel of the vehicle, a roller carried by said carriage, a fluid pump mounted on said carriage, means drivingly coupling said roller to said pump, a control valve mounted on the vehicle, a fluid circuit connected to said pump and including said control valve, said control valve being arranged to provide a controlled amount of restriction in said fluid circuit, fluid pressure means including a foot pedal actuator on the vehicle arranged to move the carriage toward the wheel responsive to operation of said foot pedal actuator, spring means biasing said carriage away from the wheel, ratchet means arranged to secure said carriage in a position wherein said roller is in driving engagement with said wheel, said ratchet means including a longitudinal ratchet bar on the vehicle and a pawl pivoted to the carriage and being lockingly engageable with said ratchet bar, and a release member mounted on the vehicle adjacent said foot pedal actuator and being operatively connected to said pawl.

References Cited in the file of this patent

UNITED STATES PATENTS

| 712,048 | Diamant et al. | Oct. 28, 1902 |
| 1,399,591 | Uffert | Dec. 6, 1921 |
| 1,711,929 | Druhe | May 7, 1929 |
| 1,735,529 | Dey | Nov. 12, 1929 |
| 2,225,079 | Neal | Dec. 17, 1940 |

FOREIGN PATENTS

| 651,617 | Germany | Oct. 16, 1937 |